L. S. THOMPSON, dec'd.

J. B. THOMPSON, Adm'r.

Window-Screens.

No. 6,179.

Reissued Dec. 22, 1874.

Witnesses

A. P. Grant.

L. F. Brass.

Inventor

Lewis S. Thompson Dec'd

Jas. B. Thompson Adm'r.

John W. Boughton.

assignee.

by John A. Wintershimer attys.

UNITED STATES PATENT OFFICE.

JOHN W. BOUGHTON, OF PHILADELPHIA, PA., ASSIGNEE OF JAMES B. THOMPSON, ADMINISTRATOR OF L. S. THOMPSON, DECEASED.

IMPROVEMENT IN WINDOW-SCREENS.

Specification forming part of Letters Patent No. 37,779, dated February 24, 1863; reissue No. 6,179, dated December 22, 1874; application filed March 25, 1874.

*To all whom it may concern:*

Be it known that LEWIS S. THOMPSON, of the city of Brooklyn, in the county of Kings and the State of New York, has invented a new and useful Improvement in Mosquito-Frames for Windows; and the following is declared to be a clear and exact description of the nature thereof, sufficient to enable others skilled in the art to which the invention appertains to fully understand, make, and use the same, reference being had to the accompanying drawings making part of this specification, in which—

Figure 1:
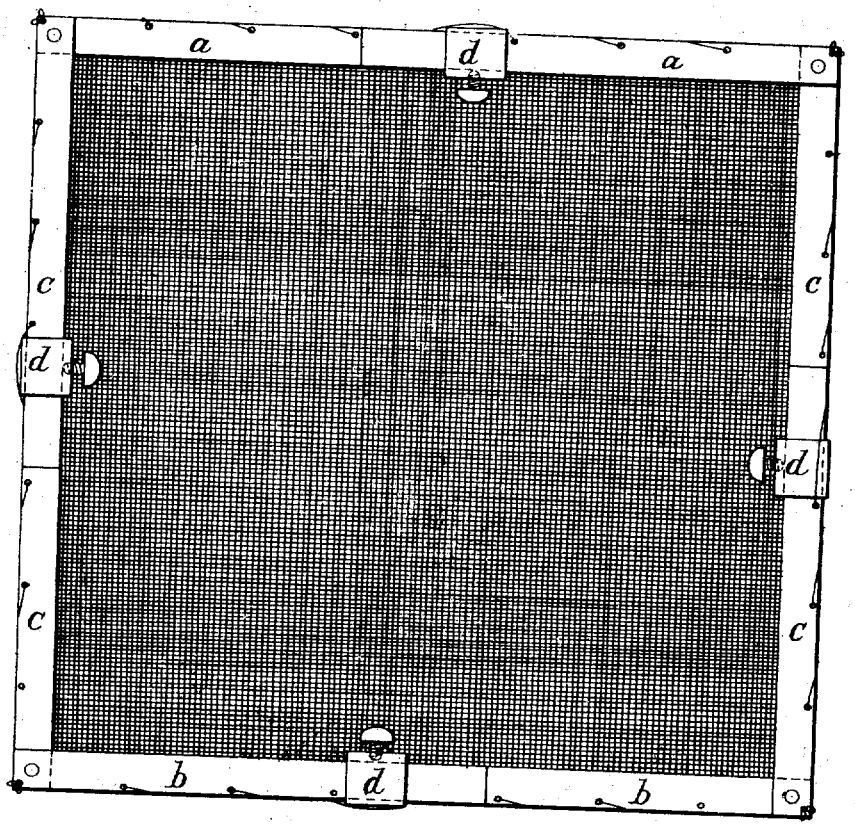
Figure 2:
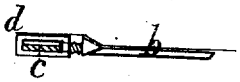

Figure 1 is a front view of the device embodying the invention. Fig. 2 is a section of one side of the frame.

Similar letters of reference indicate corresponding parts in the two figures.

Frames have heretofore been made to set within or against the open window to receive mosquito-netting or gauze to keep out flies and other insects. These frames have to be fitted to the window with care, or else any opening at the side would defeat the object of the netting.

The nature of this said invention consists in an expanding adjustable frame for windows, that can be enlarged or contracted at pleasure sufficiently to accommodate the variations in size usually existing in windows, and said frames to receive netting or gauze of any character stretched upon it.

Referring to the drawings, *a a* are the top bars, *b b* the bottom bars, and *c c* the side bars, of the frame. These may be united at the corners by rivets, so that the bars thus formed can be folded together for transportation or packing away. *d d* are clips attached at or near the respective ends of certain of the bars, and receiving through them the other bars respectively, so that the frame is made of bars that may be lengthened or shortened by sliding one part through the clip on the other part, and a screw or spring-catch may be employed for holding the bars at the position to which they may be moved.

A frame made in this manner may be extended so as to fit various sizes of windows. The frame is to be covered with the ordinary gauze or netting, secured in any convenient manner, such netting being represented as attached by sewing through holes in the bars.

It will be evident that round bars, instead of flat ones, may be used, in which case it is the best to have one bar sliding into a pipe, and retained in place, when expanded, by a spring upon the pipe taking notches in the bars.

This frame may be made of any suitable material, though metal is preferred.

What is claimed, and desired to be secured by Letters Patent, is—

1. A window-screen constructed with bars forming separable frames, which slide one upon another, to permit the adjustment of the screen to the size of the window, substantially as set forth.

2. The joints at the angles, in combination with the adjustable bars *a b c*, as explained.

JNO. W. BOUGHTON.

Witnesses:
JNO. A. BELL,
JOHN A. WIEDERSHEIM.